Jan. 11, 1966 L. J. BOLAND ETAL 3,229,078

CODE CONVERTER

Filed June 29, 1962 2 Sheets-Sheet 1

INVENTORS
LAWRENCE J. BOLAND
ROBERT KESLIN
GERALD H. OTTAWAY
WILLIAM V. WRIGHT

BY Carl C. Kling
ATTORNEY

United States Patent Office 3,229,078

Patented Jan. 11, 1966

3,229,078

CODE CONVERTER

Lawrence J. Boland, Poughkeepsie, Robert Keslin and Gerald H. Ottaway, Hyde Park, and William V. Wright, Poughkeepsie, N.Y., assignors to International Business Machines Corporation, New York, N.Y., a corporation of New York Filed June 29, 1962, Ser. No. 206,239
3 Claims. (Cl. 235—154)

This invention relates to a digital code converter, and more particularly to a bidirectional converter for a tightly packed code and a less tightly packed semicompatible code, which operates by table lookup of mixed numbers in the two codes.

Typical semicompatible codes are binary coded hexidecimal BCH and binary coded decimal BCD. Partial products are developed as mixed numbers each having a high order hexidecimal digit and a low order decimal digit. This allows two digits to span decimal values 0 to 159.

*Bit*

A bit is the basic item of information which, by its presence or absence, provides intelligent data. In data processing systems, a bit is usually signified by a specific electrical signal or magnetic state. Anything other than the specific electrical signal or magnetic state is "not bit," since the bit conveys intelligent data by its presence or absence. "Not bit" has data significance equal and opposite to "bit." The value "bit" is usually represented as a 1; the "not bit" in a position where a bit is expected (bit position) is usually represented as a "0."

*Binit*

Since it is possible to confuse the terms "bit," meaning "1" value in a bit position, with "bit position," which can hold either a 1 or a 0 and which may be set differently at different times, the term "binit" is coming into use to signify the content (either 1 or 0) of a specified bit position. A binit is one binary symbol in a group of binary symbols. Six binits, then, are six binary symbols which may convey up to sixty-four different values 0–63 (000000–111111) by various combinations of "bit" values and "not bit" values.

*Byte*

A byte is a group of binits which is generally treated as a group of data manipulation purposes. A four-binit byte, for example, is a useful data group for processing. The four-binit byte can carry sixteen binary values zero (0000) through fifteen (1111). This corresponds to a hexidecimal digit or to a decimal digit if binary values 1010–1111 are unused.

*Binary coded hexidecimal—BCH*

This is a radix 16 code (values 0 to 15) and is completely compatible with full binary codes. It is four binits per digit, and BCH carries propagate upward from the high order binit of one BCH digit to the low order binit of the next higher order BCH digit. Binits are valued (8–4–2–1). BCH digits may be called

0–1–2–3–4–5–6–7–8–9–U–V–W–X–Y–Z (corresponding to decimal

0–1–2–3–4–5–6–7–8–9–10–11–12–13–14–15)

The hexidecimal digit, having no great utility in itself because human acceptance is low, usually is a part of a binary number value of many binits and as such is referred to simply as a "byte."

*Binary coded decimal—BCD*

This is a radix 10 code (values 0 to 9) which follows the binary format except that not all high orders are used. The value 9 (1001) is detected in some manner and the next higher value, instead of the next higher binary value 10 (1010), is arbitrarily designated 0 (0000) and a carry. The carry, once developed, may be propagated upward to the low order binit of the next higher order binary coded decimal digit. Binits are valued (8–4–2–1).

NUMBER SYSTEM CONVERSION ALGORITHMS

*Hexidecimal to decimal*

Conversion from hexidecimal to decimal can become a complicated matter if many digital orders are involved, since it is possible for conversion of a single order to affect several other orders. For example, hexidecimal 1–15–11 (1–Z–V) converts to decimal 507 but hexidecimal 10–15–11 (U–Z–V) converts to decimal 2811, involving a different number of orders. Consider, for example, the following hexidecimal number:

$$(Z)_{16}(U)_{16}(7)_{16}=(1111)_2(1010)_2(0111)_2$$

This can be equated to a decimal number as follows:

$$(Z)_{16}(U)_{16}(7)_{16}=(15)_{10}\times(16)^2{}_{10}+(10)_{10}\times(16)^1{}_{10}+(7)_{10}\times(16)^0{}_{10}$$

The right hand decimal number can be factored:

$$(Z)_{16}(U)_{16}(7)_{16}=[(15)_{10}(16)_{10}+(10)_{10}]\times(16)^1{}_{10}+(7)_{10}$$

This last expression becomes the algorithm which can be expressed by the following steps:

(1) Convert the high order byte of the hexidecimal number to be converted to decimal and put the result in the partial result field.

(2) Multiply the partial result by decimal 16 to form a new partial result field.

(3) Convert the next high order byte of the number to be converted to decimal.

(4) Add the converted number to the partial result.

Repeat steps 2–4 until the field to be converted has been exhausted. The partial result accumulation is the answer.

Simplified, the algorithm is as follows:

Multiply the partial result accumulation by the first code radix and add the next lower byte to form a new partial result accumulation (performing operations in the second code).

*Decimal to hexidecimal*

Where the codes are semicompatible, as in BCH and BCD, conversion to the less densely packed code follows a similar algorithm and is generally simpler, because there are no overflow possibilities.

The algorithm can be expressed in the following steps:

(1) Convert the high order digit of the decimal number to be converted to hexidecimal and put the result in the partial result field.

(2) Multiply the partial result by hexidecimal U to form a new partial result field.

(3) Convert the next high order digit of the number to be converted to hexidecimal.

(4) Add the converted number to the partial result.

Repeat steps 2–4 until the field to be converted is exhausted. The partial result accumulation is the answer.

Simplified, the algorithm is as follows:

Multiply the partial result accumulation by the first code radix and add the next lower byte to form a new partial result accumulation (performing operation in the second code).

Note that the simplified algorithm is identical for conversion in both directions.

*Conversion tables*

To the average person, the multiplication table "times sixteen" is a mystery, though he may know $16^2=256$ and a few others. If he is converting a large group of hexidecimal numbers to decimal numbers, he may find a written "times 16" multiplication table handy, as follows:

[×16 table]

| | | | | | | | | | | | | | | | |
|---|---|---|---|---|---|---|---|---|---|---|---|---|---|---|---|
| | | | | | | | | | U | V | W | X | Y | Z | |
| 1 | 2 | 3 | 4 | 5 | 6 | 7 | 8 | 9 | 10 | 11 | 12 | 13 | 14 | 15 | 16 |
| 16 | 32 | 48 | 64 | 80 | 96 | 112 | 128 | 144 | 160 | 176 | 192 | 208 | 224 | 240 | 256 |

The large the group of conversions, the more sophisticated the table may become. A table of hexidecimal to decimal conversions might be developed up to hexidecimal ZZZ. Such a table, however, cannot conveniently be generated each time the person desires to make a few conversions. It is too big. It is more convenient to follow the usual practice which is to make digit-by-digit conversions to decimal, multiply by the appropriate power of 16, and add the partial products so generated.

In a computer, table size must also be kept within bounds. A computer operating in BCH and BCD may conveniently hold a table of ×16 multiples 0–9 and ×10 multiples 0–15. In a particular computer, two four-binit binary adders with decimal correction may be available for use with a table in converting by table lookup. BCH-BCD conversion can be carried out according to the algorithms.

*Use of mixed numbers*

Table lookup techniques provide the partial products of the factors ×16. The digit to be multiplied by sixteen may provide its own table address as shown above in the small ×16 table.

A complication, however, is that in the partial product development incident in BCH-BCD conversion an overflow out of two BCD digits is to be expected in certain situations. The product of 16×7, 16×8 and 16×9 are respectively 112, 128 and 144. Each of these partial products encompasses three decimal digits—there is no room for the hundreds order digit.

The solution is to code the ×16 product as a mixed number having a BCD low order digit and a BCH high order byte, as shown below:

| Multiplication | Decimal product | Mixed product | Binit structure of mixed product |
|---|---|---|---|
| 1×16= | $(1)_{10}(6)_{10}=$ | $(1)_{16}(6)_{10}=$ | $(0001)_2(0110)_2$ |
| 2×16= | $(3)_{10}(2)_{10}=$ | $(3)_{16}(2)_{10}=$ | $(0011)_2(1000)_2$ |
| 3×16= | $(4)_{10}(8)_{10}=$ | $(4)_{16}(8)_{10}=$ | $(0100)_2(0010)_2$ |
| 4×16= | $(6)_{10}(4)_{10}=$ | $(6)_{16}(4)_{10}=$ | $(0110)_2(0100)_2$ |
| 5×16= | $(8)_{10}(0)_{10}=$ | $(8)_{16}(0)_{10}=$ | $(1000)_2(0000)_2$ |
| 6×16= | $(9)_{10}(6)_{10}=$ | $(9)_{16}(6)_{10}=$ | $(1001)_2(0110)_2$ |
| 7×16= | $(1)_{10}(1)_{10}(2)_{10}=$ | $(V)_{16}(2)_{10}=$ | $(1011)_2(0010)_2$ |
| 8×16= | $(1)_{10}(2)_{10}(8)_{10}=$ | $(W)_{16}(8)_{10}=$ | $(1100)_2(1000)_2$ |
| 9×16= | $(1)_{10}(4)_{10}(4)_{10}=$ | $(Y)_{16}(4)_{10}=$ | $(1110)_2(0100)_2$ |

CHARACTERISTICS OF INVENTION

*Object*

The object of the invention is to convert bidirectionally between a packed code and unpacked semicompatible code by table lookup, using a partial result accumulation algorithm for conversion, avoiding overflow situations where they might otherwise occur by developing partial products in mixed number form with the high order byte in the first code and the low order digit in the second code.

*Features*

A feature of the invention is a binary-hexidecimal to binary-decimal code converter matrix, addressable by a binary-hexidecimal byte S on one side and a binary-decimal digit P on the other side to provide a partial product $(16P+S)$ in mixed number form with the high order byte of the mixed number in binary-hexidecimal and the low order digit in binary-decimal, connected to logic necessary to provide sustained operation to convert multi-digit numbers without necessity for arithmetic operations.

A second feature of the invention is a binary-hexidecimal partial product matrix addressable by a binary-decimal digit to provide a partial product 16 P in mixed number form with the high order byte a binary-hexidecimal digit and the low order digit in binary-decimal, with adders and logic necessary to provide sustained operation to convert multi-digit numbers.

A third feature is the use of the same structure (with a different conversion table) to convert bidirectionally.

*Advantages*

The mixed number approach allows bidirectional sustained operation conversion to be performed by pure table lookup in a matrix addressable by two four-binit bytes or performed by a four-binit adder together with a small matrix addressable by a single four-binit digit. The nature of the partial product multiplications 16×7, 16×8 and 16×9 is such that there would be an overflow if conversion were not made with the packed code digit. The mixed number approach also allows identical handling of new first code bytes with the retained high order bytes of the table output. Both are introduced additively into the patrial result accumulation at particular times by a common circuit path involving only simple gating.

The foregoing and other objects, features and advantages of the invention will be apparent from the following more particular description of preferred embodiments of the invention, as illustrated in the accompanying drawings.

*Figures*

SUMMARY

Figure 1:
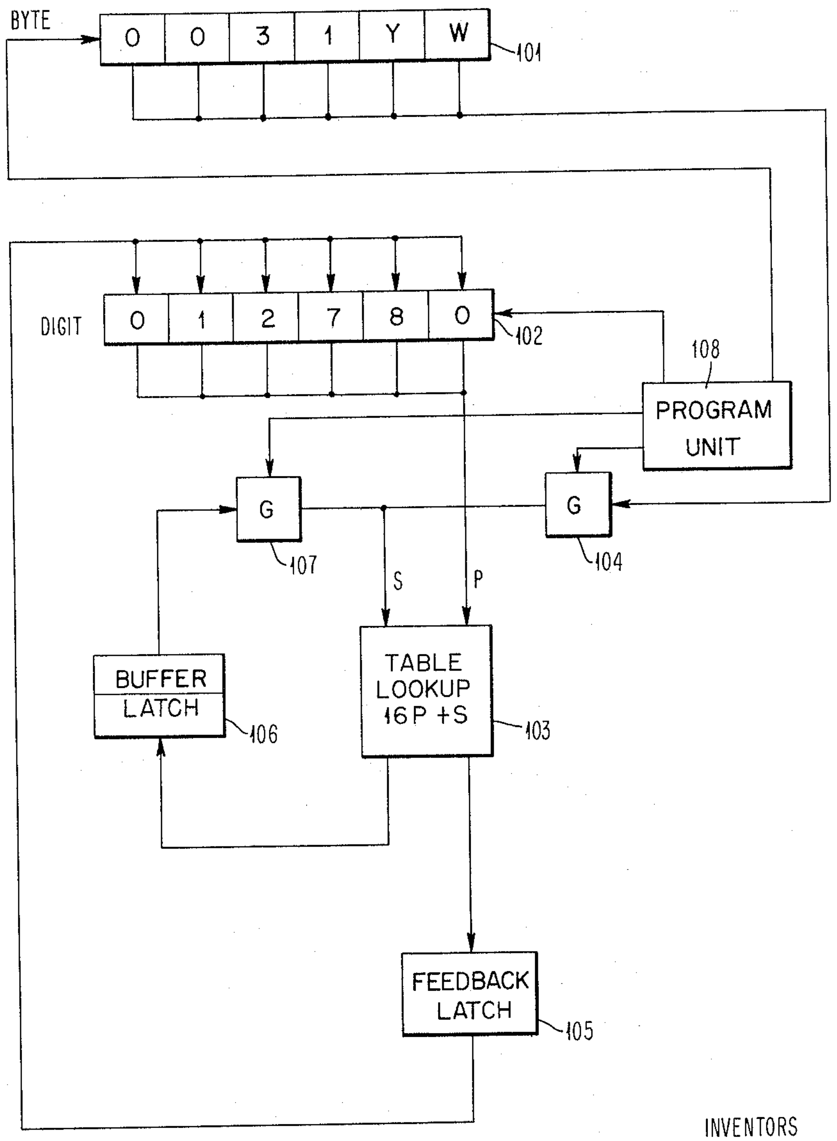
FIGURE 1 is a block diagram of a first embodiment of the invention, which uses full table lookup procedures to accumulate the partial result.

The invention converts a first code number-value stored in byte distributor 101 to an equivalent second code number-value, by partial result accumulation in digit distributor 102. Program unit 108 defines major cycles, each including an initial minor cycle and a fixed number of secondary minor cycles. Initial and secondary minor cycle signals control gates 104 and 107, respectively. A reference is made to table lookup mechanism 103 on each minor cycle.

The table output is a value including the partial product (radix×digit) in mixed number form, with the high order byte in the first code and the low order digit in the second code. The second code digit modifies digit distributor 102 as a digit of the developing partial result; the high order byte is retained in buffer 106 for one minor cycle. In this fashion the partial result updating operation is always the result of a similar combining operation—on initial cycles the new first code byte is taken, in descending order, from byte distributor 101; on secondary minor cycles the retained high order byte from the previous table output is taken from buffer 106 and handled exactly as the new first code byte was handled on the initial minor cycle. This combination with the value (radix×digit) provides the actual second code digit for storage in ascending order in distributor 102.

TABLE LOOKUP EMBODIMENT—FIGURE 1

The first code number to be converted to the second code appears initially in byte register 101. Each byte section includes four binits. Digit distributor 102 is initially reset to all zeros, but as the conversion operation progresses is set to the partial result accumulation values. At the end of the conversion operation, the result (in the second code) appears in digit distributor 102. The byte and digit registers 101–102 are distributor registers controllable to provide serial-by-byte (or serial-by-digit) outputs.

The low order digit in the digit register 102 is first applied to table lookup mechanism 103 along with the high order byte from the byte register 101, which is passed at this time by gate 104. It takes a byte and a digit to address the table, a first code high order byte P and a second code low order digit S. The table responds with a second code low order digit which feeds back to digit register 102 via latch 105, and with a first code high order digit which feeds back in a tight loop via buffer latch 106 and gate 107 to address the table for the next reference. Gates 104 and 107 are operated in complementary fashion; the byte passing to the high order of the table is always in the first code.

In operation, several table references are taken for each first code byte, so that partial product accumulations can be developed. These table references occur on minor cycles; several minor cycles form a major cycle. The first minor cycle of a major cycle is called "initial minor cycle." On the initial minor cycle, gate 104 passes a first code byte from byte register 101, to reference the table. On all other minor cycles, called secondary minor cycles, gate 107 passes a first code byte from buffer latch 106, to reference the table. Program unit 108 provides control signals "initial minor cycle" and "secondary minor cycle" to operate the gates, and "major cycle" and "minor cycle" to operate the distributor registers.

*Functional units*

The distributor registers may be trigger registers each equipped with its own polling ring. The ring may be closed so that they recycle automatically. Program unit 108 includes a suitable master timer to delineate minor cycles; the ring for the digit register advances upon the minor cycle signals to access each digit in ascending order. The digit register ring makes a complete cycle for each advance of the byte register ring. The final position of the digit register ring can thus control advance of the byte register ring, via suitable program unit interconnections; coincidence at the final position of both rings can terminate the operation. Details of the distributor registers, which may take many forms in different computers, are not a part of this invention.

The choice of distributor may affect the choice of other portions of the mechanism. A preferred type of distributor can readout on the first half of a minor cycle and readin on the second half. To prevent critical race situations from developing in feedback loops, latches may be used. These latches are gated midway of the minor cycle and thus prevent race situations from developing. On the first half of a given minor cycle, for example, a digit in digit distributor 102 references table lookup mechanism 103, providing a table output digit which passes to feedback latch 105; on the second half of the same minor cycle, feedback latch 105 passes the digit back to the accessed position of digit distributor 102. Other types of distributors might be capable of reading in and out simultaneously and thus not require any latches at all.

Buffer 106 and latch 107 are similar in timing to digit distributor 102 and feedback latch 105, respectively. On the first half of a minor cycle, a byte from buffer 106 references table lookup mechanism 103, providing a table output byte to latch 106; on the second half of the cycle the byte passes to buffer 106 for use on the next minor cycle.

Table lookup mechanism may be a permanently wired matrix, or may be suitable mechanism to reference a table stored in the main computer memory. The usual procedure is to let the byte and digit address table locations in a memory block, and to provide from the program unit a fixed address to identify the block.

Conversion matrices for different code combinations can thus be simply chosen by a fixed address selected to access the particular block in which the matrix values were previously stored.

The hexidecimal to decimal conversion table is as follows:

[16 P+S Table]

| P value | S values | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 0 | U | V | W | Y | Z |
| 0 | 0 | 01 | 02 | 03 | 04 | 05 | 06 | 07 | 08 | 09 | 10 | 11 | 12 | 13 | 14 | 15 |
| 1 | 16 | 17 | 18 | 19 | 20 | 21 | 22 | 23 | 24 | 25 | 26 | 27 | 28 | 29 | 30 | 31 |
| 2 | 32 | 33 | 34 | 35 | 36 | 37 | 38 | 39 | 40 | 41 | 42 | 43 | 44 | 45 | 46 | 47 |
| 3 | 48 | 49 | 50 | 51 | 52 | 53 | 54 | 55 | 56 | 57 | 58 | 59 | 60 | 61 | 62 | 63 |
| 4 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 |
| 6 | 96 | 97 | 98 | 99 | U0 | U1 | U2 | U3 | U4 | U5 | U6 | U7 | U8 | U9 | V0 | V1 |
| 7 | V2 | V3 | V4 | V5 | V6 | V7 | V8 | V9 | W0 | W1 | W2 | W3 | W4 | W5 | W6 | W7 |
| 8 | W8 | W9 | X0 | X1 | X2 | X3 | X4 | X5 | X6 | X7 | X8 | X9 | Y0 | Y1 | Y2 | Y3 |
| 9 | Y4 | Y5 | Y6 | Y7 | Y8 | Y9 | Z0 | Z1 | Z2 | Z3 | Z4 | Z5 | Z6 | Z7 | Z8 | Z9 |

(Underlined digits are hexidecimal; other digits are decimal).

*Operation*

The full table lookup mode of operation can best be understood from an example. Many table references are necessary to provide housekeeping for the partial products. Consider the hexidecimal value 0031YW shown in byte distributor 101. This hexidecimal value converts to decimal 012780. It is advisable to retain two high order 0 bytes in the hexidecimal number to be converted to avoid overflow.

There are two basic types of reference cycles, major and minor. The major cycle is the cycle wherein a new hexidecimal byte is introduced from byte distributor 101, manipulated according to the algorithm and added to an accumulation of partial results in digit distributor 102. There is a number of major cycles equal to the number of byte positions in byte distributor 101. The major cycle includes a number of minor cycles equal to the number of digit positions in digit distributor 102. Each of the digits is polled in turn during each major cycle to update the partial result. Polling of the digits on minor cycles in digit distributor 102 is from low order upward or right to left in the figure. Polling of the digits in byte register 101, however, is from high order downward or left to right in the figure and occurs on the initial minor cycle of each major cycle. Example 1 is detailed in the following chart:

| Major cycle | Minor cycle | S | | P | 16 P+S | To buffer |
|---|---|---|---|---|---|---|
| | | Byte distributor | From buffer | | | |
| | 1 | 0031YW | (*) | 000000 | 000000 | 0 |
| | 2 | (*) | 0 | 000000 | 000000 | 0 |
| | 3 | (*) | 0 | 000000 | 000000 | 0 |
| 1 | 4 | (*) | 0 | 000000 | 000000 | 0 |
| | 5 | (*) | 0 | 000000 | 000000 | 0 |
| | 6 | (*) | 0 | 000000 | 000000 | 0 |
| | 1 | 0031YW | (*) | 000000 | 000000 | 0 |
| | 2 | (*) | 0 | 000000 | 000000 | 0 |
| | 3 | (*) | 0 | 000000 | 000000 | 0 |
| 2 | 4 | (*) | 0 | 000000 | 000000 | 0 |
| | 5 | (*) | 0 | 000000 | 000000 | 0 |
| | 6 | (*) | 0 | 000000 | 000000 | 0 |
| | 1 | 0031YW | (*) | 000000 | 000003 | 0 |
| | 2 | (*) | 0 | 000003 | 000003 | 0 |
| | 3 | (*) | 0 | 000003 | 000003 | 0 |
| 3 | 4 | (*) | 0 | 000003 | 000003 | 0 |
| | 5 | (*) | 0 | 000003 | 000003 | 0 |
| | 6 | (*) | 0 | 000003 | 000003 | 0 |
| | 1 | 0031YW | (*) | 000003 | 000009 | 4 |
| | 2 | (*) | 4 | 000009 | 000049 | 0 |
| | 3 | (*) | 0 | 000049 | 000049 | 0 |
| 4 | 4 | (*) | 0 | 000049 | 000049 | 0 |
| | 5 | (*) | 0 | 000049 | 000049 | 0 |
| | 6 | (*) | 0 | 000049 | 000049 | 0 |
| | 1 | 0031YW | (*) | 000049 | 000048 | Z |
| | 2 | (*) | Z | 000048 | 000098 | 7 |
| | 3 | (*) | 7 | 000098 | 000798 | 0 |
| 5 | 4 | (*) | 0 | 000798 | 000798 | 0 |
| | 5 | (*) | 0 | 000798 | 000798 | 0 |
| | 6 | (*) | 0 | 000798 | 000798 | 0 |
| | 1 | 0031YW | (*) | 000798 | 000790 | Y |
| | 2 | (*) | Y | 000790 | 000780 | Z |
| | 3 | (*) | Z | 000780 | 000780 | W |
| 6 | 4 | (*) | W | 000780 | 002780 | 1 |
| | 5 | (*) | 1 | 002780 | 012780 | 0 |
| | 6 | (*) | 0 | 012780 | 012780 | 0 |

*Not gated.
(Underlined digits are currently accessed).

*Major cycle 1*

As the conversion operation commences, byte distributor 101 holds 0031YW and digit distributor 102 holds 000000. On the very first cycle (major cycle 1, minor cycle 1) the high order 0 becomes the S quantity and is gated via gate 104 to table lookup mechanism 103. Digit distributor 102 holds all 0's; low order 0 is the P quantity which is applied to table lookup mechanism 103. Addressing the table lookup mechanism by 00 provide a 00 output mixed number. The low order 0 of the output mixed number passes via latch 105 to the accessed low order digit position of digit register 102. The high order 0 of the mixed number passes to carry latch 106. On the second minor cycle, the second order 0 in digit distributor 102 is the P quantity and passes directly to table lookup mechanism 103. Gate 104 is operated only on the initial minor cycle of each major cycle; gate 107 is operated on all other minor cycles to provide the S quantity.

Buffer latch 106 on minor cycle 2 contains a 0 quantity which is gated via gate 107 to provide the S digit to table lookup mechanism 103. Since both S and P are 0's, a 0 is placed in latch 105 and a 0 in buffer latch 106. Polling of digit distributor 102 continues through six minor cycles without altering the all 0's condition of digit distributor 102.

*Major cycle 2*

Minor cycle 6 is followed by minor cycle 1 of major cycle 2. Here again a 0 byte is the S quantity and a 0 digit is the P quantity. Digit distributor 102 is polled in another group of six minor cycles but still retains its all 0's condition.

*Major cycle 3*

On the initial minor cycle of the major cycle 3, hexidecimal byte 3 is gated via gate 104 to provide the S digit to table lookup mechanism 103. Note that the output of the table lookup mechanism 103 is $16P+S$. At this point P is still all 0's and $16P=0$. $16P+S=3$ with a high order 0 digit. The 3 passes via feedback latch 105 back to the accessed low order position of digit distributor 102 and the high order 0 passes to latch 106. On the following minor cycle, the second high order byte of byte distributor 102 is used to reference the table. Digit distributor 102 is polled through its five high order 0's and at the end of major cycle 3 contains value 000003.

*Major cycle 4*

Operation now begins in earnest. As major cycle 4 begins, there is a significant S quantity and also a significant P quantity. The S quantity 1 passes via gate 104 to table lookup mechanism 103 and the P quantity 3 also passes to the table lookup mechanism. Table lookup mechanism 103 provides output $16P+S$; $16\times3=48$ and $S=1$; $16P+S=49$. The 9 passes via feedback latch 105 to the accessed low order position of digit distributor 102 and the high order 4 passes to buffer latch 106 for reuse on the following secondary minor cycle. On the second minor cycle of major cycle 4, buffer latch 106 provides the byte 4 via gate 107 as the S quantity; the P quantity is the 0 from the second order of digit distributor 102. $16P+S=4$ with a high order 0; the 4 passes through latch 105 to the accessed second order digit position of digit distributor 102 and the high order 0 passes to buffer latch 106. On the third minor cycle of major cycle 4 the S quantity is 0 from buffer latch 106 and the P quantity is 0 from the third order of digit distributor 102. Four high order digit positions of digit distributor 102 are polled and their 0 table outputs pass to digit distributor 102; the table references are $S=0$, $P=0$ and the table output 00. Digit distributor 102 at the end of major cycle 4 contains value 000049.

*Major cycle 5*

Major cycle 5 begins by gating hexidecimal digit $\underline{Y}$ via gate 104 as the S quantity to table lookup mechanism 103 together with the 9 from the low order digit position of digit distributor 102. Table output $\underline{Z}8$ causes an 8 to be stored in the accessed low order digit position of digit distributor 102 while buffer latch 106 stores the $\underline{Z}$. On minor cycle 2 the $\underline{Z}$ from buffer latch 106 passes via gate 107 to reference the table along with the 4 from the accessed second order digit position of digit distributor 102, to provide table output $\underline{7}9$. Buffer 106 stores the $\underline{7}$ while the 9 passes to the accessed second order digit position of digit distributor 102. On minor cycle 3, the S quantity $\underline{7}$ and P quantity 0 reference the table for table output $\underline{0}7$. Minor cycles 4, 5 and 6 of major cycle 5 are $\underline{0}0$ table references. The three high order digit positions of digit distributor 102 are polled and their 0 table outputs pass to digit distributor 102; the able references are $S=\underline{0}$, $P=0$ and the table outputs $\underline{0}0$.

*Major cycle 6*

At the beginning of major cycle 6 digit distributor 102 holds 0000798. Hexidecimal digit $\underline{W}$ from the low order position in byte distributor 101 is provided via gate 104 as the S quantity to table lookup mechanism 103. At the same time the low order 8 in result register 102 is provided as the P quantity. Table lookup mechanism 103 provides the output $16P+S$ which is $\underline{Y}0$. The $\underline{Y}$ hexidecimal digit is stored in buffer latch 106 and the 0 decimal digit passes via latch 105 back to the currently accessed low order position of digit distributor 102. On minor cycle 2 of major cycle 6, hexidecimal digit $\underline{Y}$ from buffer latch 106 passes via gate 107 as the S quantity to table lookup mechanism 103 along with the 9 which is stored in the second order digit position of digit distributor 102. Table output $16P+S$ is $\underline{Z}8$; the $\underline{Z}$ is stored in buffer latch 106 and the 8 passes via latch 105 to be stored in the second order digit position of digit distributor 102. On minor cycle 3 of major cycle 6, the $\underline{Z}$ from buffer latch 106 passes via gate 107 as the S quantity to table lookup mechanism 103 along with the 7 from the third order digit position of digit distributor 102. Table output $16P+S$ is $\underline{W}7$. The $\underline{W}$ is stored in buffer latch 106 and the 7 passes via latch 105 to the currently accessed third order position of digit distributor 102. On minor cycle 4 of major cycle 6 buffer latch 106 provides hexidecimal digit $\underline{W}$ via gate 107 as the S quantity to table lookup mechanism 103. The P quantity is the 0 from the fourth order digit position of digit distributor 102. Table output $16P+S$ is $\underline{1}2$. The $\underline{1}$ is stored in buffer latch 106 and the low order 2 digit passes via litch 105 back to the currently accessed fourth order digit position of result register 102. On minor cycle 5 of major cycle 6, the $\underline{1}$ from buffer latch 106 passes via gate 107 as the S quantity at the same time that a 0 from the fifth order digit position of result register 102 is provided as the P quantity. Table output $16P+S$ is 1. The 1 passes via latch 105 to the order 5 digit position is result register 102. Minor cycle 6 of major cycle 6 is the final cycle. The $\underline{0}$ in carry latch 106 and the 0 in the high order digit position of result register 102 addressed the table to provide an output $\underline{0}0$. The low order 0 passes via latch 105 to the high order to result register 102 to provide the final answer 012780.

*Summary of full table lookup embodiment*

The converter operates on major and minor cycles. Each major cycle includes a number of minor cycles equal to the number of digits of the possible decimal result. On each major cycle a new hexidecimal digit taken from the high order end is brought out and added to 16 times the partial product accumulation. The table lookup is done essentially one digit at a time during a series of minor cycles equal to the number of decimal digit positions in the digit distributor. On each minor cycle, a new digit of the accumulated partial product is multiplied by 16 and has added to it the high order byte from the previous table output. In this way the accumulation of partial products is multiplied by 16 and at the same time in the same operation, the new hexidecimal digit is added in according to the algorithm. Providing table lookup in mixed number fashion allows the carry to be in hexidecimal code. This provides a double advantage. The first advantage, of course, is that the hexidecimal digit has greater capacity than the decimal digit and thus can accommodate numbers resulting from multiplications 7, 8 and 9 which would overflow the decimal digits. Another advantage is that the identical matrix can be used as table lookup during the introduction of the new hexidecimal digit and during the partial results updating combination with the ×16 multiplication. This provides a simple and very effective table lookup conversion on a continuous basis depending fully on the size of the byte and result distributors.

ADDER EMBODIMENT—FIGURE 2

The hexidecimal number is placed in byte distributor 201; the decimal equivalent is accumulated in digit distributor 202. To perform the necessary ×16 multiplication, digit distributor 202 is connected to table lookup mechanism 203 which provides a mixed number output including a high order hexidecimal digit and a low order decimal digit. During conversion, gate 204 directs the hexidecimal digit from byte distributor 201 in descending order from the high order position at left. Buffer latch 206 passes its content (the high order hexidecimal digit of the mixed number result of a table lookup) via gate 207 to adder I 209. Adder I has its own carry latch 210 which is operative to retain overflow of type carries from the previous addition. The output of adder I 209 and table lookup mechanism 203 passes to adder II 211 which has its own carry latch 212 and to feedback latch 205 which passes the results of the decimal conversion to digit distributor 202. This embodiment operates on major and minor cycles just as does the full table lookup embodiment. The same example may be used for conversion of 0031YW to its decimal equivalent 016890. Gates 204 and 207 are the full equivalent of gates 104 and 107; operation is generally the same except that the table is much less sophisticated and adders are used. The table is simply a ×16 table for digits 0–9 as follows:

[×16]

| 0 | 1 | 2 | 3 | 4 | 5 | 6 | 7 | 8 | 9 |
|---|---|---|---|---|---|---|---|---|---|
| 0 | 16 | 32 | 48 | 64 | 80 | 96 | 112 | 128 | 144 |
| $\underline{0}0$ | $\underline{1}6$ | $\underline{3}2$ | $\underline{4}8$ | $\underline{6}4$ | $\underline{8}0$ | $\underline{9}6$ | $\underline{U}2$ | $\underline{W}8$ | $\underline{Y}4$ |

On each initial minor cycle a hexidecimal byte from byte distributor 201 passes via gate 204 to the decimal correct logic of adder I 209. Such decimal correct logic is disclosed and described in detail in U.S. Patent Number 2,907,526, issued October 6, 1959, Electronic Accumulator, B. L. Havens (Serial Number 620,073, filed November 2, 1956) assignee IBM. What this decimal correct circuit accomplishes, by gating techniques, is to convert the hexidecimal output of four-binet binary adder I to the equivalent decimal digit plus a possible carry. Since the maximum is $\underline{Z}$ (15) plus a carry in for hexidecimal $\underline{1}0$ (decimal 16) the carry is a 1 in either code. The carry, however, might best be though of a hexidecimal since it is applied alongside a hexidecimal input. Conversions are:

| BCH digit | Carry in | BCD digit | Carry out |
|---|---|---|---|
| Z | 1 | 6 | 1 |
| Z | 0 | 5 | 1 |
| Y | 1 | 5 | 1 |
| Y | 0 | 4 | 1 |
| X | 1 | 4 | 1 |
| X | 0 | 3 | 1 |
| W | 1 | 3 | 1 |
| W | 0 | 2 | 1 |
| V | 1 | 2 | 1 |
| V | 0 | 1 | 1 |
| U | 1 | 1 | 1 |
| U | 0 | 0 | 1 |
| 9 | 1 | 0 | 1 |
| 9 | 0 | 9 | 0 |

Other BCH digits form BCD digits of identical bit structure. Adder I 209 is equipped with its own carry latch 210; when conversion from BCH to BCD produces a carry, such carry is stored for one full minor cycle and submitted to adder I 209 on the next minor cycle. Note that adder I performs no addition; for the purposes of this invention alone it need have no arithmetic capability. The decimal correct requirement, however, is identical to that of addition and adder I is useful in other operations which require arithmetic capability. Adder I must be capable of adding only a carry.

Adder I 209 is a common path for all bytes. Gate 204 controls introduction of new bytes from byte distributor 201 on initial minor cycles; gate 207 controls introduction of the high order byte from the previous table output on secondary minor cycles. Each byte is subjected to decimal correction and applied as an input to adder II 211. Adder II 211 adds the low order digit from the current table output to the decimally corrected byte and provides a sum digit to feedback latch 205 for storage back in the accessed digit position of digit distributor 202. A carry developing in adder II 211 is stored in carry latch 212 for a full minor cycle, and introduced into the next addition.

EXAMPLE

*Major cycles 1–2–3*

The first two major cycles involve all zero's operations. Digit distributor 202 is polled twice; twelve table references each yield 00. The high order 0 byte of each table reference is stored for a minor cycle in buffer latch 206; the low order 0 digit of each table reference passes directly to adder II 211. The 0 bytes all convert to decimal 0 without carry; the deicmal 0 values are fed to adder II 211. Adder II responds to the 00 input with a 0 output digit and 0 carry. The 0 output digit is stored in the accessed position of digit distributor 202.

Major cycle 3 produces byte 3, which converts to decimal 3 and is added to 0 to provide digit 3 which is stored in the low order position of digit distributor 202. The secondary minor cycles of major cycle 3 operate with all 0's.

*Major cycle 4*

Digit distributor 202 holds 000003 as the major cycle commences. The P digit thus is 3 which addresses table lookup mechanism 203 to provide the 16P table output 48. The high order byte 4 is retained in buffer latch 206; the low order digit 8 passes directly to adder II 211. Since this is an initial minor cycle, gate 204 is active, and the fourth byte 1 passes from byte distributor 201 as the S quantity to adder I decimal correct logic 209, providing a decimal 1 value and a 0 carry. Adder II thus has inputs 18 and provides output digit 9 which is placed in the accessed position of digit distributor 202 under timing control of feedback latch 205. On minor cycle 2 of major cycle 4, buffer latch 206 produces the retained hexidecimal byte 4 which passes via gate 207 (this is a secondary minor cycle) and via adder I decimal correct mechanism 209 to adder II 211. The accessed tens order digit in digit distributor 202 is 0; this addresses table lookup mechanism 203 to produce 00. Adder II combines the 4 and the 0 and sends the sum digit 4 to be stored in the accessed tens order digit position of digit distributor 202. Further operations in the fourth major cycle are all 0's operations.

*Major cycle 5*

Digit distributor 202 holds 000049. The P digit is 9; the new byte S from byte distributor 201 is Y. Table 203 provides 16P which is Y4; the Y is retained in buffer latch 206 while the 4 passes directly to adder II 211. BCH byte Y converts to BCD 4 plus 1 carry; the carry 1 is retained by carry latch 210 for use on the next cycle while the 4 passes to adder II 211. Adder II receives inputs 44 and provides output 8 which is stored in the units position of digit distributor 202. On the minor cycle 2 of major cycle 5, the P digit is 4 which provides table output 64. The S byte is the Y from buffer latch 206, which passes via gate 207 to adder I decimal correct logic 209, along with the carry which was retained from the previous cycle in carry latch 210. Decimal correct logic 209 produces decimal value 5 and a 1 carry which is retained in carry latch 210. The inputs to adder II 211 are thus 5 and 4 which produce output digit 9 which is stored in the tens digit position of digit distributor 202.

On minor cycle 3 of major cycle 5, the retained 6 from buffer latch 206 and the retained 1 carry from carry latch 210 are applied to decimal correct logic 209 to produce value 7. The accessed hundreds position of digit distributor 202 is a 0 and produces a table output 00. Values 70 are the inputs to adder II 211 which develops sum digit 7 for storage in the accessed hundreds position of digit distributor 202.

*Major cycle 6*

Digit distributor 202 holds 000798.

On minor cycle 1, byte W passes via gate 204 to decimal correct logic 209, providing decimal value 2 and a 1 carry. The accessed units digit position of digit distributor 202 produces an 8 which addresses table lookup mechanism 203 to provide table output W8. The W is retained in buffer latch 206 and the 8 passes to adder II 211. Adder II 211 responds to inputs 2 and 8 by producing digit 0 for storage in the accessed units position of digit distributor 202, and retaining a 1 carry in carry latch 212.

As minor cycle 2 commences, buffer latch 206 holds W; carry latches 210 and 212 each hold 1. The accessed tens position of digit distributor 202 holds value 9, which produces from table lookup mechanism 203 the mixed number Y4. The 4 passes to adder II while the Y is retained in buffer latch 206. The W from buffer latch 206, together with the carry 1 retained in carry latch 210, provide from decimal correct logic 209 the decimal value 3 and a carry 1. Adder II thus has inputs 3, 4 and carry 1. It provides output digit 8 for storage in the accessed tens position of digit distributor 202.

On minor cycle 3, the accessed hundreds position of digit distributor 202 holds 7, buffer latch 206 holds Y, and carry latch 210 holds 1. Table lookup mechanism responds to the 7 by providing table output Y2; the Y passes to buffer latch 206 and the 2 to adder II 211.

Decimal correct logic 209 responds to the Y and carry with a decimal value 5 and a 1 carry. Adder II 211 receives inputs 5 and 2 and provides output digit 7 which is stored at the accessed position of digit distributor 202.

On minor cycle 4, the accessed digit position of the digit distributor holds a 0. Buffer latch 206 holds V and carry latch 210 holds 1. These values decimal correct to decimal value 2 with a carry of 1. Adder II 211 receives the decimal value 2 together with the decimal digit 0 from the table lookup and provides a 2 output for storage in the accessed thousands position of digit distributor 202.

On minor cycle 5, all values are 0 except the 1 in carry latch 210. This decimal corrects to 1 and provides a 1 output from adder II 211 which is stored in the ten thousands position of digit distributor 202.

The sixth minor cycle of major cycle 6 is an all 0's operation. On this cycle, the program unit recognizes termination of the conversion operation.

DECIMAL TO HEXIDECIMAL CONVERSION

This conversion follows the same algorithm but requires, in the full table lookup embodiment of FIGURE 1, a new table with values 10 $P+S$ with the high order byte in decimal and the low order digit in hexidecimal. For value $P$=V and $S$=9, for example, the table provides 10 $P+S$ output mixed number (159) 9Z; for value $P=U$ and $S=6$ (106), mixed number 43.

Figure 2:
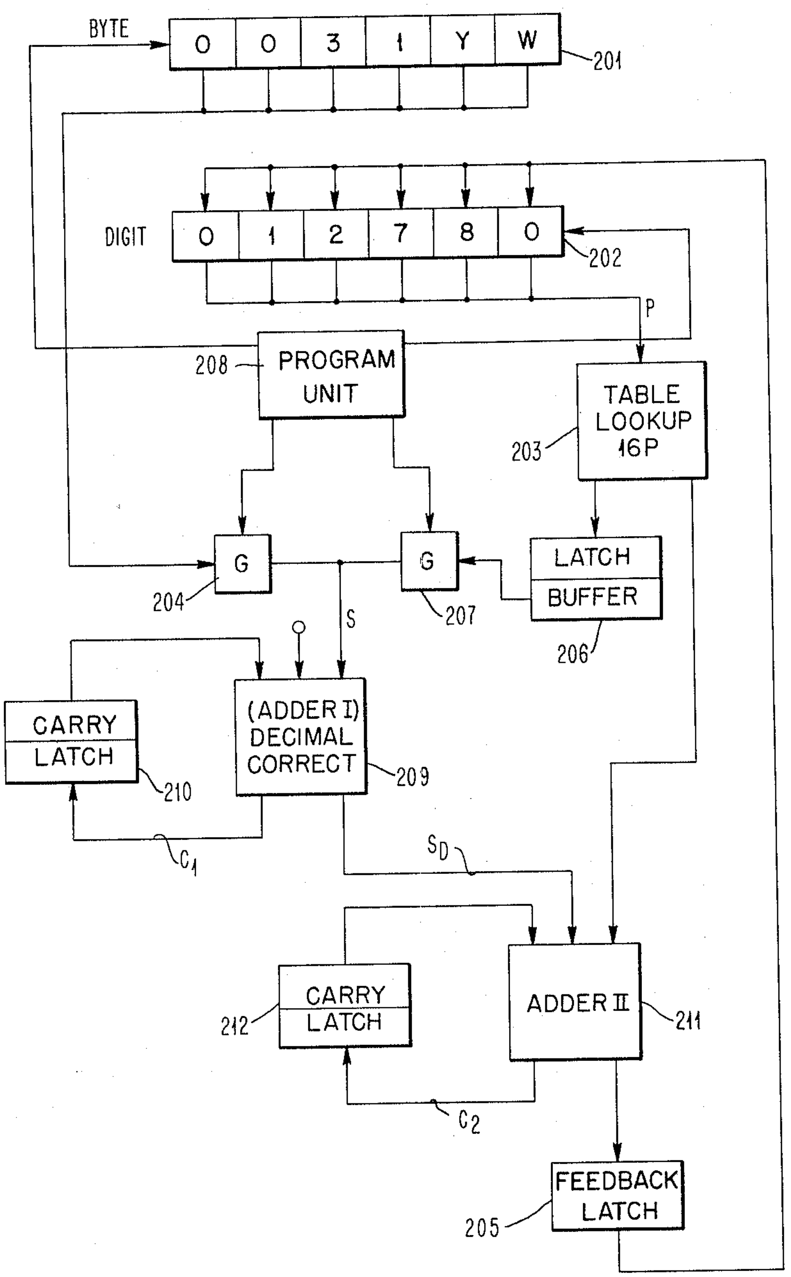
FIGURE 2 is a block diagram of a second embodiment of the invention, which uses table lookup procedures to develop partial products but accumulates partial results arithmetically.

In the arithmetic embodiment of FIGURE 2, a new table is also required, with values 10 P. The decimal correct logic of adder I is disabled so that the hexidecimal value passes through decimal correct logic 209 unmolested and $S=S_D$. The decimal correct feature of adder II 211 is also disabled, so that adder II 211 operates in hexidecimal.

FINAL SUMMARY

Conversion from a first code to a second code is accomplished effectively by table lookup techniques using mixed numbers, with the high order byte in the first code and the low order byte in the second code. This allows the same mechanism to operate in both directions, with simple changes to the table and to adder controls if adders are used.

The mixed number format allows a simple complementary gate to control introduction of new first code bytes when appropriate and to control development of higher order partial product digits in the implementation of the algorithm where the partial result is multiplied by the radix.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Code converter mechanism for converting a number-value expressed as a sequence of ordered bytes in a first code into an equal number-value expressed as a sequence of ordered digits in a second code, using partial results accumulation techniques according to the algorithm.

multiply the partial result accumulation by the first code radix and add the next lower byte to form a new partial result accumulation (performing operations in the second code)

comprising:

program means providing a sequence of operation control signals defining a sequence of minor cycles and a sequence of major cycles, each major cycle including an initial minor cycle and a given number of secondary minor cycles;

a byte distributor responsive to major cycle control signals from said program means to access byte positions in descending order upon successive major cycles;

a digit distributor responsive to minor cycle control signals from said program means to access the low order digit position on initial minor cycles and to access successive ascending order digit positions upon successive secondary minor cycles;

table lookup means connected to said digit distributor register in such manner that the accessed digit references a table output including its "times the radix" multiple value in mixed number form with the high order byte in the first code and the low order digit in the second code;

feedback means connected to said table lookup means and to said digit distributor to place in the accessed position of said digit distributor the low order digit of the table output;

buffer means connected to said table lookup means to retain for a minor cycle the high order digit of the table output; and gating means responsive to initial minor cycle control signals from said program means to produce the accessed byte from said byte distributor register and responsive to secondary minor cycle control signals from said program means to produce the retained digit from buffer means for further use in accumulation of partial results.

2. Code converter mechanism according to claim 1 wherein:

said table lookup means is set up to produce a table output ($P\times$radix$+S$) when referenced by a digit P and a byte S, output ($P\times$radix$+S$) being in the form of a mixed number with the high order byte in the first code and the low order digit in the second code;

said gating means controls passage of bytes to said table lookup means so that, upon each table reference, the table is referenced by a high order byte S and a low order digit P, the low order referencing digit always coming from the accessed position of said digit distributor, the high order referencing byte selectively coming from the accessed position of said byte distributor on initial minor cycles and from said buffer means on secondary minor cycles, whereby conversion is by a full table lookup technique.

3. Code converter mechanism according to claim 1 wherein:

said table lookup means is set up to provide output when referenced by a referencing digit coming from the accessed position of said digit distributor to provide $P\times$first radix) in mixed number form with the high order byte in the first code and the low order digit in the second code;

said feedback means includes a single-digit adder operating in the second code, connected to said table lookup means and to said buffer means, to receive as inputs the low order digit of the current table output and the high order byte of the previous table output; and said gating means includes radix correction means which converts a single byte in the first code to a single digit (carry retained if necessary) in the second code.

References Cited by the Examiner

UNITED STATES PATENTS

| | | | |
|---|---|---|---|
| 3,018,959 | 1/1962 | Thomas | 340—172.5 |
| 3,031,650 | 4/1962 | Koerner | 340—172.5 |

MALCOLM A. MORRISON, *Primary Examiner.*